(12) United States Patent
Olofsson et al.

(10) Patent No.: US 10,327,194 B2
(45) Date of Patent: Jun. 18, 2019

(54) BASE STATION, NETWORK CONTROLLER, AND FORWARD HANDOVER METHOD

(71) Applicant: Huawei Technologies Co., Ltd., Shenzhen (CN)

(72) Inventors: Henrik Olofsson, Kista (SE); Li Chai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 15/270,878

(22) Filed: Sep. 20, 2016

(65) Prior Publication Data

US 2017/0013532 A1    Jan. 12, 2017

Related U.S. Application Data

(63) Continuation of application No. PCT/CN2014/073841, filed on Mar. 21, 2014.

(51) Int. Cl.
*H04W 36/38* (2009.01)
*H04W 36/08* (2009.01)
(Continued)

(52) U.S. Cl.
CPC ....... *H04W 36/38* (2013.01); *H04W 36/0055* (2013.01); *H04W 36/08* (2013.01); *H04W 64/00* (2013.01); *H04W 76/18* (2018.02)

(58) Field of Classification Search
None
See application file for complete search history.

(56) References Cited

U.S. PATENT DOCUMENTS

2008/0280594 A1   11/2008  Voyer et al.
2009/0046578 A1*   2/2009  Aydin ............... H04W 76/19
                                                370/221
(Continued)

FOREIGN PATENT DOCUMENTS

CN    101313618 A    11/2008
CN    101917747 A    12/2010
(Continued)

OTHER PUBLICATIONS

"$3^{rd}$ Generation Partnership Project; Technical Specification Group Radio Access Network; Evolved Universal Terrestrial Radio Access Network (E-UTRAN); X2 application protocol (X2AP) (Release 12)," 3GPP TS 36.423, V12.1.0, pp. 1-144, $3^{rd}$ Generation Partnership Project, Valbonne, France (Mar. 2014).
(Continued)

*Primary Examiner* — Robert C Scheibel
(74) *Attorney, Agent, or Firm* — Leydig, Voit & Mayer, Ltd.

(57) ABSTRACT

The embodiments of the present invention provide a base station, a network controller, and a forward handover method. The base station includes a first base station to which a target cell of user equipment belongs and a second base station to which the user equipment belongs, where the second base station includes: a second processor and a second transceiver, the second processor generates a forward handover indication, and the second transceiver sends the forward handover indication to the first base station, so that when receiving an RRC re-establishment request message of the user equipment, the first base station acquires context information of the user equipment from the second base station according to the forward handover indication. In the foregoing manner, the user equipment can independently select a target cell, and overcomes a disadvantage of vio-
(Continued)

lating a basic criterion in the prior art that mobility management is determined and controlled by a network.

16 Claims, 5 Drawing Sheets

(51) Int. Cl.
    *H04W 36/00*     (2009.01)
    *H04W 64/00*     (2009.01)
    *H04W 76/18*     (2018.01)

(56) References Cited

U.S. PATENT DOCUMENTS

| | | | | |
|---|---|---|---|---|
| 2009/0247159 A1* | 10/2009 | Flore | | H04W 24/02 |
| | | | | 455/434 |
| 2010/0330993 A1 | 12/2010 | Kone | | |
| 2011/0080825 A1* | 4/2011 | Dimou | | H04J 11/0086 |
| | | | | 370/216 |
| 2013/0065595 A1* | 3/2013 | Hu | | H04W 36/0033 |
| | | | | 455/436 |
| 2014/0087739 A1* | 3/2014 | Weaver | | H04W 16/18 |
| | | | | 455/441 |
| 2014/0220985 A1 | 8/2014 | Lin | | |
| 2015/0264609 A1* | 9/2015 | Zhang | | H04W 36/0055 |
| | | | | 455/436 |
| 2016/0044548 A1* | 2/2016 | Choi | | H04W 36/04 |
| | | | | 370/331 |
| 2016/0142949 A1* | 5/2016 | Ohta | | H04W 36/0055 |
| | | | | 455/437 |
| 2018/0124658 A1* | 5/2018 | Van Lieshout | | H04W 36/0055 |

FOREIGN PATENT DOCUMENTS

| | | |
|---|---|---|
| CN | 101919284 A | 12/2010 |
| CN | 101998664 A | 3/2011 |
| CN | 102045713 A | 5/2011 |
| CN | 102348191 A | 2/2012 |
| CN | 103002452 A | 3/2013 |
| EP | 1890512 A1 | 2/2008 |
| WO | 2013137599 A1 | 9/2013 |

OTHER PUBLICATIONS

"Analysis of context fetch in HetNet scenario," 3GPP TSG-RAN WG3 Meeting #83, Prague, Czech Republic, R3-140111, $3^{rd}$ Generation Partnership Project, Valbonne, France (Feb. 10-11, 2014).
"UE context fetch," 3GPP TSG RAN WG3 #83, Prague, Czech Republic, R3-140140, $3^{rd}$ Generation Partnership Project, Valbonne, France (Feb. 10-14, 2014).
"Analysis of Context Fetch Solutions," 3GPP TSG-RAN WG3 Meeting #83, Prague, Czech Republic, R3-140337, $3^{rd}$ Generation Partnership Project, Valbonne, France (Feb. 10-14, 2014).
"Avoidance of RRC re-establishment failures," 3GPP TSG RAN WG3 Meeting #83bis, San Jose del Cabo, Mexico, R3-140586, $3^{rd}$ Generation Partnership Project, Valbonne, France (Mar. 31-Apr. 4, 2014).
CN 201480026681.7, Office Action, dated Aug. 3, 2018.

* cited by examiner

BASE STATION, NETWORK CONTROLLER, AND FORWARD HANDOVER METHOD

CROSS-REFERENCE TO RELATED APPLICATIONS

This application is a continuation of International Application No. PCT/CN2014/073841, filed on Mar. 21, 2014, the disclosure of which is hereby incorporated by reference in its entirety.

TECHNICAL FIELD

The embodiments of present invention relates to the field of communications technologies, and in particular, to a base station, a network controller, and a forward handover method.

BACKGROUND

Currently, multiple small cells may be disposed within coverage of a Long Term Evolution (LTE) macro base station (Macro eNB), for example, a radio access point, such as a pico base station (Pico), a home eNodeB (HeNB), or a relay base station (Relay). In this way, user equipment (UE) is located in dual coverage of the macro base station and the small cell, and a maximum capacity that can be acquired by the user equipment is a sum of a capacity of the macro base station and a capacity of the small cell, Compared with user equipment in a conventional LTE macro base station network, the user equipment has a higher capacity. In a scenario, such as an office building, a shopping mall, or a school VPN, by means of heterogeneous deployment of the macro base station and the small cell, network coverage can be effectively enhanced, and spectral efficiency can be effectively improved.

Figure 1:
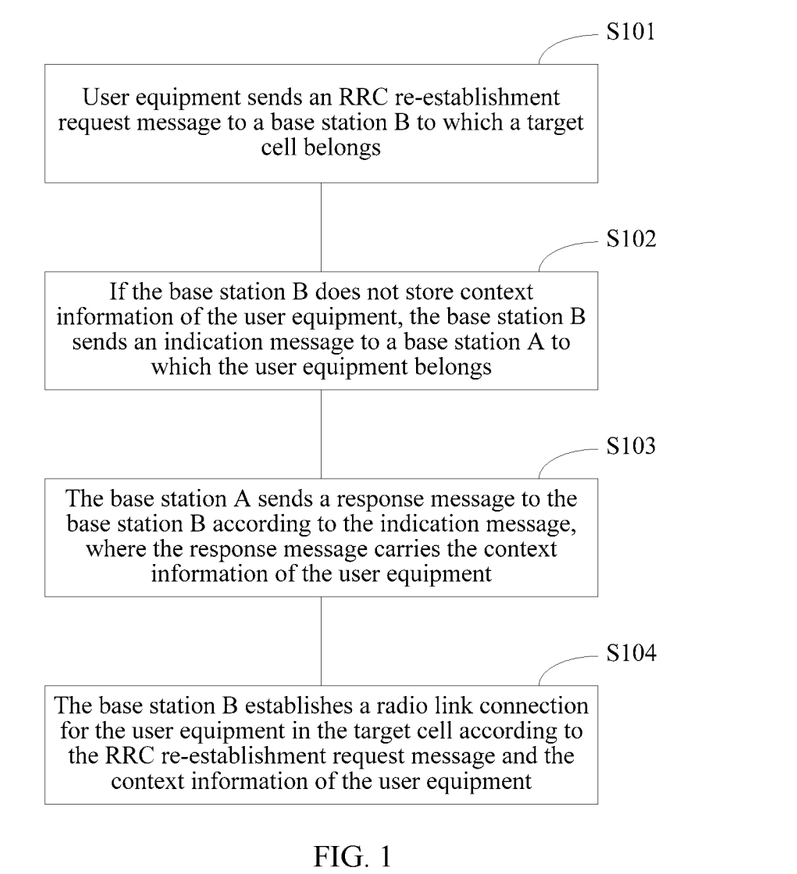
FIG. 1 is a flowchart of a cell handover method for user equipment according to the prior art.

In a heterogeneous network, UE can be connected only to one cell, the cell is referred to as a serving cell of the UE, and a base station may include one or more cells. Referring to FIG. 1, FIG. 1 is a flowchart of handing over user equipment to a cell according to the prior art. As shown in FIG. 1, after a radio link failure (RLF) occurs in the UE, the method disclosed in this embodiment includes:

S101: User equipment sends an RRC (radio resource control) re-establishment request message to a base station B to which a target cell belongs.

S102: When the base station B receives the RRC re-establishment request message, if the base station B does not store context information of the user equipment, the base station B sends an indication message to a base station A to which the user equipment belongs, where the indication message carries indication information that requests to feed back the context information of the user equipment.

S103: The base station A sends a response message to the base station B according to the indication message, where the response message carries the context information of the user equipment.

S104: The base station B establishes a radio link connection for the user equipment in the target cell according to the RRC re-establishment request message and the context information of the user equipment.

When the user equipment in the prior art selects the target cell, mobility of the user equipment gets out of network control, which violates a basic criterion in the prior art that mobility management, such as handover of the user equipment, is determined and controlled by a network.

SUMMARY

In view of this, the embodiments of the invention provides a base station, a network controller, and a forward handover method, where user equipment can independently select a target cell, and overcomes a disadvantage of violating a basic criterion in the prior art that mobility management, such as handover of the user equipment, is determined and controlled by a network.

A first aspect provides a base station, where the base station includes a first base station to which a target cell of user equipment belongs and a second base station to which the user equipment belongs, where the second base station includes: a second processor and a second transceiver, the second processor generates a forward handover indication, and the second transceiver sends the forward handover indication to the first base station, so that when receiving a radio resource control RRC re-establishment request message of the user equipment, the first base station acquires context information of the user equipment from the second base station according to the forward handover indication.

With reference to an implementation manner of the first aspect, in a first possible implementation manner, the second processor further acquires the target cell of the user equipment.

With reference to the first possible implementation manner of the first aspect, in a second possible implementation manner, the second processor acquires the target cell according to positioning information of the user equipment, historical information of the user equipment, and/or measurement report information of the user equipment; and/or the second processor acquires the target cell according to mobility robustness optimization MRO information, or a load of the first base station.

With reference to the implementation manner of the first aspect, in a third possible implementation manner, the forward handover indication includes an identifier of the user equipment, an identifier of the target cell, and an allowed identifier; or the forward handover indication includes an identifier of the user equipment and an identifier of the target cell; or the forward handover indication includes an identifier of the user equipment, an identifier of the target cell, and a prohibited identifier; or the forward handover indication includes an identifier of the target cell and an allowed identifier.

With reference to the third possible implementation manner of the first aspect, in a fourth possible implementation manner, the forward handover indication further includes an identifier of a source cell of the user equipment.

With reference to the fourth possible implementation manner of the first aspect, in a fifth possible implementation manner, the identifier of the user equipment includes a combination of at least one of the following: a cell radio network temporary identifier CRNTI, a short MAC integrity protection verification value Short MAC-I, or an international mobile equipment identity IMEI, and both the identifier of the source cell and the identifier of the target cell include a combination of at least one of the following: a physical cell identity PCI, an evolved cell global identifier ECGI, a tracking area identity TAI, or an E-UTRA absolute radio-frequency channel number EARFCN.

With reference to the implementation manner of the first aspect, in a sixth possible implementation manner, the forward handover indication further includes time information, where the forward handover indication is valid within a period of time of the time information.

A second aspect provides a forward handover method, where the method includes: generating, by a second base station to which the user equipment belongs, a forward handover indication, and sending, by the second base station, the forward handover indication to a first base station to which a target cell of the user equipment belongs, so that when receiving an RRC re-establishment request message of the user equipment, the first base station acquires context information of the user equipment from the second base station according to the forward handover indication.

With reference to an implementation manner of the second aspect, in a first possible implementation manner, before the generating, by a second base station, a forward handover indication, the method further includes: acquiring, by the second base station, the target cell of the user equipment.

With reference to the first possible implementation manner of the second aspect, in a second possible implementation manner, the acquiring, by the second base station, the target cell of the user equipment includes: acquiring, by the second base station, the target cell according to positioning information of the user equipment, historical information of the user equipment, and/or measurement report information of the user equipment; and/or acquiring, by the second base station, the target cell according to MRO information, or a load of the first base station.

With reference to the implementation manner of the second aspect, in a third possible implementation manner, the forward handover indication includes an identifier of the user equipment, an identifier of the target cell, and an allowed identifier; or the forward handover indication includes an identifier of the user equipment and an identifier of the target cell; or the forward handover indication includes an identifier of the user equipment, an identifier of the target cell, and a prohibited identifier; or the forward handover indication includes an identifier of the target cell and an allowed identifier.

With reference to the third possible implementation manner of the second aspect, in a fourth possible implementation manner, the forward handover indication further includes an identifier of a source cell of the user equipment.

With reference to the fourth possible implementation manner of the second aspect, in a fifth possible implementation manner, the identifier of the user equipment includes a combination of at least one of the following: a CRNTI, a Short MAC-I, or an IMEI, and both the identifier of the source cell and the identifier of the target cell include a combination of at least one of the following: a PCI, an ECGI, a TAI, or an EARFCN.

With reference to the implementation manner of the second aspect, in a sixth possible implementation manner, the forward handover indication further includes time information, where the forward handover indication is valid within a period of time of the time information.

A third aspect provides a network controller, where the network controller is Operation, Administration and Maintenance OAM, where the OAM includes a processor and a transceiver, the processor generates a forward handover indication, and the transceiver configures the forward handover indication for a first base station to which a target cell of user equipment belongs, so that when receiving an RRC re-establishment request message of the user equipment, the first base station acquires context information of the user equipment from a second base station to which the user equipment belongs according to the forward handover indication.

With reference to an implementation manner of the third aspect, in a first possible implementation manner, the processor further acquires the target cell of the user equipment.

With reference to the first possible implementation manner of the third aspect, in a second possible implementation manner, the processor acquires the target cell according to MRO information, or a load of the first base station.

With reference to the implementation manner of the third aspect, in a third possible implementation manner, the forward handover indication includes an identifier of a source cell of the user equipment, an identifier of the target cell, and an allowed identifier.

With reference to the third possible implementation manner of the third aspect, in a fourth possible implementation manner, both the identifier of the source cell and the identifier of the target cell include at least: a PCI, an ECGI, a TAI, or an EARFCN.

With reference to the implementation manner of the third aspect, in a fifth possible implementation manner, the forward handover indication further includes time information, where the forward handover indication is valid within a period of time of the time information.

A fourth aspect provides a forward handover method, where the method includes: generating, by a network controller, a forward handover indication, and configuring, by the network controller, the forward handover indication for a first base station to which a target cell of the user equipment belongs, where the network controller is OAM, so that when receiving an RRC re-establishment request message of the user equipment, the first base station acquires context information of the user equipment from a second base station to which the user equipment belongs according to the forward handover indication.

With reference to an implementation manner of the fourth aspect, in a first possible implementation manner, before the generating, by a network controller, a forward handover indication, the method further includes: acquiring, by the OAM, the target cell of the user equipment.

With reference to the first possible implementation manner of the fourth aspect, in a second possible implementation manner, the acquiring, by the network controller, the target cell of the user equipment includes: acquiring, by the OAM, the target cell according to MRO information, or a load of the first base station.

With reference to the implementation manner of the fourth aspect, in a third possible implementation manner, the forward handover indication includes an identifier of a source cell of the user equipment, an identifier of the target cell, and an allowed identifier.

With reference to the third possible implementation manner of the fourth aspect, in a fourth possible implementation manner, both the identifier of the source cell and the identifier of the target cell include at least: a PCI, an ECGI, a TAI, or an EARFCN.

With reference to the implementation manner of the fourth aspect, in a fifth possible implementation manner, the forward handover indication further includes time information, where the forward handover indication is valid within a period of time of the time information.

A fifth aspect provides a base station, where the base station includes a first base station to which a target cell of user equipment belongs and a second base station to which the user equipment belongs, where the first base station includes: a first processor and a first transceiver, and the first transceiver receives a forward handover indication from the second base station or a network controller, so that when receiving an RRC re-establishment request message of the user equipment, the first processor acquires context information of the user equipment from the second base station according to the forward handover indication.

With reference to an implementation manner of the fifth aspect, in a first possible implementation manner, the forward handover indication includes an identifier of the user equipment, an identifier of the target cell, and an allowed identifier; or the forward handover indication includes an identifier of the user equipment and an identifier of the target cell; or the forward handover indication includes an identifier of the user equipment, an identifier of the target cell, and a prohibited identifier; or the forward handover indication includes an identifier of the target cell and an allowed identifier.

With reference to the first possible implementation manner of the fifth aspect, in a second possible implementation manner, the forward handover indication further includes an identifier of a source cell of the user equipment.

With reference to the second possible implementation manner of the fifth aspect, in a third possible implementation manner, the identifier of the user equipment includes a combination of at least one of the following: a CRNTI, a Short MAC-I, or an IMEI, and both the identifier of the source cell and the identifier of the target cell include a combination of at least one of the following: a PCI, an ECGI, a TAI, or an EARFCN.

With reference to the implementation manner of the fifth aspect, in a fourth possible implementation manner, the acquiring, by the first processor, when receiving an RRC re-establishment request message of the user equipment, context information of the user equipment from the second base station according to the forward handover indication includes: determining, by the first processor, whether the first base station receives the forward handover indication; and if the first base station receives the forward handover indication, acquiring, by the first processor, the context information of the user equipment from the second base station and generating an RRC re-establishment message, and sending, by the first transceiver, the RRC re-establishment message to the user equipment, or if the first base station does not receive the forward handover indication, generating, by the first processor, a re-establishment rejection message, and sending the re-establishment rejection message to the user equipment by means of the first transceiver; or determining, by the first processor, whether the forward handover indication is invalid; and if the forward handover indication is valid, acquiring, by the first processor, the context information of the user equipment from the second base station and generating an RRC re-establishment message, and sending, by the first transceiver, the RRC re-establishment message to the user equipment, or if the forward handover indication is invalid, generating, by the first processor, a re-establishment rejection message, and sending the re-establishment rejection message to the user equipment by means of the first transceiver; or if the first base station receives the forward handover indication, and the forward handover indication indicates that the first base station is allowed to acquire the context information of the user equipment from the second base station, acquiring, by the first processor, the context information of the user equipment from the second base station and generating an RRC re-establishment message, and sending, by the first transceiver, the RRC re-establishment message to the user equipment, or if the first base station receives the forward handover indication, and the forward handover indication indicates that the first base station is prohibited from acquiring the context information of the user equipment from the second base station, generating, by the first processor, a re-establishment rejection message, and sending the re-establishment rejection message to the user equipment by means of the first transceiver.

A sixth aspect provides a forward handover method, where the method includes: receiving, by a first base station to which a target cell of user equipment belongs, a forward handover indication from a second base station to which the user equipment belongs or a network controller, so that when receiving an RRC re-establishment request message of the user equipment, the first base station acquires context information of the user equipment from the second base station to which the user equipment belongs according to the forward handover indication.

With reference to an implementation manner of the sixth aspect, in a first possible implementation manner, the forward handover indication includes an identifier of the user equipment, an identifier of the target cell, and an allowed identifier; or the forward handover indication includes an identifier of the user equipment and an identifier of the target cell; or the forward handover indication includes an identifier of the user equipment, an identifier of the target cell, and a prohibited identifier; or the forward handover indication includes an identifier of the target cell and an allowed identifier.

With reference to the first possible implementation manner of the sixth aspect, in a second possible implementation manner, the forward handover indication further includes an identifier of a source cell of the user equipment.

With reference to the second possible implementation manner of the sixth aspect, in a third possible implementation manner, the identifier of the user equipment includes a combination of at least one of the following: a CRNTI, a Short MAC-I, or an IMEI, and both the identifier of the source cell and the identifier of the target cell include a combination of at least one of the following: a PCI, an ECGI, a TAI, or an EARFCN.

With reference to the implementation manner of the sixth aspect, in a fourth possible implementation manner, the acquiring, by the first base station, when receiving an RRC re-establishment request message of the user equipment, context information of the user equipment from the second base station to which the user equipment belongs according to the forward handover indication includes: determining whether the first base station receives the forward handover indication; and if the first base station receives the forward handover indication, acquiring, by the first base station, the context information of the user equipment from the second base station and generating an RRC re-establishment message, and sending, by the first base station, the RRC re-establishment message to the user equipment, or if the first base station does not receive the forward handover indication, generating, by the first base station, a re-establishment rejection message, and sending the re-establishment rejection message to the user equipment; or determining whether the forward handover indication is invalid; and if the forward handover indication is valid, acquiring, by the first base station, the context information of the user equipment from the second base station and generating an RRC re-establishment message, and sending, by the first base station, the RRC re-establishment message to the user equipment, or if the forward handover indication is invalid, generating, by the first base station, a re-establishment rejection message and sending the re-establishment rejection message to the user equipment; or if the first base station receives the forward handover indication, and the forward handover indication indicates that the first base station is allowed to acquire the context information of the user equipment from the second base station, acquiring, by the first base station, the context information of the user equipment from the second base station and generating an RRC re-establishment message, and sending, by the first base station, the RRC re-establishment message to the user equipment, or if the first base station receives the forward handover indication, and the forward handover indication indicates that the first base station is prohibited from acquiring the context information of the user equipment from the second base station, generating, by the first base station, a re-establishment rejection message and sending the re-establishment rejection message to the user equipment.

According to the foregoing solutions, beneficial effects of the embodiments of invention are: in the embodiments of invention, a second base station acquires a target cell of user equipment and sends a forward handover indication to a first base station, so that when receiving an RRC re-establishment request message of the user equipment, the first base station acquires context information of the user equipment from the second base station according to the forward handover indication. Therefore, the user equipment can independently select a target cell, and overcomes a disadvantage of violating a basic criterion in the prior art that mobility management, such as handover of the user equipment, is determined and controlled by a network.

BRIEF DESCRIPTION OF DRAWINGS

To describe the technical solutions in the embodiments of the embodiments of invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts, where.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
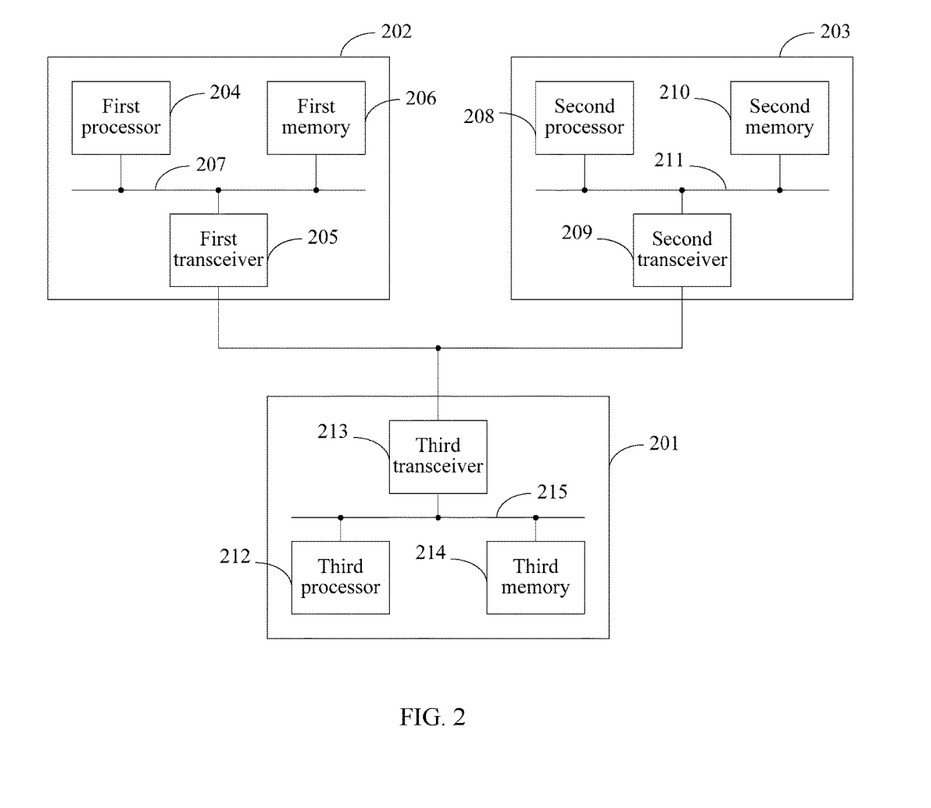
FIG. 2 is a structural diagram of a communications system according to a first embodiment of the present invention.

Referring to FIG. 2, FIG. 2 is a structural diagram of a communications system according to a first embodiment of the present invention. As shown in FIG. 2, the communications system 20 disclosed in this embodiment includes: user equipment 201, a first base station 202 to which a target cell of the user equipment 201 belongs, and a second base station 203 to which the user equipment 201 belongs. The second base station 203 is a source base station of the user equipment 201.

The first base station 202 includes: a first processor 204, a first transceiver 205, a first memory 206, and a data bus 207, where the first processor 204, the first transceiver 205, and the first memory 206 are connected by using the data bus 207, to communicate with each other. The second base station 203 includes: a second processor 208, a second transceiver 209, a second memory 210, and a data bus 211, where the second processor 208, the second transceiver 209, and the second memory 210 are connected by using the data bus 211, to communicate with each other. The user equipment 201 includes: a third processor 212, a third transceiver 213, a third memory 214, and a data bus 215, where the third processor 212, the third transceiver 213, and the third memory 214 are connected by using the data bus 215, to communicate with each other.

The communications system 20 disclosed in this embodiment is described in detail below.

The second processor 208 of the second base station 203 is configured to acquire the target cell of the user equipment 201, where the second processor 208 acquires the target cell of the user equipment 201 according to positioning information of the user equipment 201, historical information of the user equipment 201, and/or measurement report information of the user equipment 201. The positioning information of the user equipment 201, the historical information of the user equipment 201, and the measurement report information of the user equipment 201 are all stored in the second memory 210. Preferably, the positioning information of the user equipment 201 includes GPS (global positioning system) information of the user equipment 201 or OTDOA (observed time difference of arrival) information of the user equipment 201. That is, the second processor 208 determines the target cell of the user equipment 201 according to a historical position of the user equipment 201; or the second processor 208 determines that a cell whose signal strength or signal quality ranks on top in the measurement report information of the user equipment 201 is the target cell.

The second processor 208 generates a forward handover indication. The second transceiver 209 acquires the forward handover indication from the second processor 208, and sends the forward handover indication to the first base station 202. The first transceiver 205 of the first base station 202 receives the forward handover indication from the second transceiver 209, and stores the forward handover indication in the first memory 206, so that when receiving a wireless connection re-establishment request of the user equipment 201, the first base station 202 acquires context information of the user equipment 201 from the second base station 203 according to the forward handover indication. The forward handover indication includes an identifier of the user equipment 201, an identifier of the target cell, and an allowed identifier; or the forward handover indication includes an identifier of the user equipment 201 and an identifier of the target cell; or the forward handover indication includes an identifier of the user equipment 201, an identifier of the target cell, and a prohibited identifier; or the forward handover indication includes an identifier of the target cell and an allowed identifier. In addition, the forward handover indication further includes an identifier of a cell in which the user equipment 201 is located, that is, an identifier of a source cell. The identifier of the user equipment 201 includes a combination of at least one of the following: a cell radio network temporary identifier (CRNTI), a short MAC integrity protection verification value (Short MAC-I), or an international mobile equipment identity (IMEI); the identifier of the source cell and the identifier of the target cell include a combination of at least one of the following: a physical cell identity (PCI), an evolved cell global identifier (ECGI), tracking area identity (TAI), or an E-UTRA absolute radio-frequency channel number (EARFCN).

Optionally, the forward handover indication further includes time information, where the time information includes a first period of time, that is, the forward handover indication is valid within the first period of time. Out of the first period of time, the forward handover indication stored in the first base station 202 is invalid.

Optionally, the first base station 202 further includes a timer, and the timer presets a second period of time. When the first transceiver 205 of the first base station 202 receives the forward handover indication, the timer starts timing. When the timer determines that time for which the forward handover indication is stored in the first memory 206 is greater than the second period of time, the forward handover indication is invalid. The second period of time is greater than or equal to the first period of time.

Optionally, after the second processor 208 is configured to acquire the target cell of the user equipment 201, the second transceiver 209 sends information about the target cell to the user equipment 201, and the third transceiver 213 of the user equipment 201 receives the information about the target cell, and stores the information about the target cell in the third memory 214.

When a radio link failure (RLF) occurs in the user equipment 201 and the source cell, or a radio link failure occurs in a process in which the user equipment 201 hands over from the source cell to the target cell, the third processor 212 of the user equipment 201 selects a suitable target cell from the information about the target cell. For example, the third processor 212 selects a target cell having an optimal signal strength as the suitable target cell according to a measured signal strength of each target cell. The third processor 212 generates an RRC re-establishment request message, and sends the RRC re-establishment request message to the first base station 202 by means of the third transceiver 213. When receiving the RRC re-establishment request message of the user equipment 201, the first base station 202 acquires context information of the user equipment 201 from the second base station 203 according to the forward handover indication, that is, after the first base station 202 receives the RRC re-establishment request message, the first processor 204 determines whether the first base station 202 receives the forward handover indication; and if the first base station 202 receives the forward handover indication, the first processor 204 acquires the context information of the user equipment 201 from the second base station 203 by means of the first transceiver 205, and generates an RRC re-establishment success message, and the first transceiver 205 sends the RRC re-establishment success message to the user equipment 201, or if the first base station 202 does not receive the forward handover indication, the first processor 204 generates a re-establishment rejection message and sends the re-establishment rejection message to the user equipment 201 by means of the first transceiver 205. Alternatively, the first processor 204 determines whether the forward handover indication is invalid; and if the forward handover indication is valid, the first processor 204 acquires the context information of the user equipment 201 from the second base station 203 by means of the first transceiver 205, and generates an RRC re-establishment success message, and the first transceiver 205 sends the RRC re-establishment success message to the user equipment 201, or if the forward handover indication is invalid, the first processor 204 generates a re-establishment rejection message, and sends the re-establishment rejection message to the user equipment 201 by means of the first transceiver 205. Alternatively, if the first base station 202 receives the forward handover indication, and the forward handover indication indicates that the first base station 202 is allowed to acquire the context information of the user equipment 201 from the second base station 203, the first processor 204 acquires the context information of the user equipment 201 from the second base station 203 by means of the first transceiver 205, and generates an RRC re-establishment message, and the first transceiver 205 sends the RRC re-establishment message to the user equipment 201, or if the first base station 202 receives the forward handover indication, and the forward handover indication indicates that the first base station 202 is prohibited from acquiring the context information of the user equipment 201 from the second base station 203, the first processor 204 generates a re-establishment rejection message, and sends the re-establishment rejection message to the user equipment 201 by means of the first transceiver 205.

The user equipment 201 disclosed in this embodiment is not merely limited to one in quantity, and the user equipment 201 may be multiple in quantity. For example, the user equipment 201 is three in quantity.

Different from the prior art, according to the communications system disclosed in this embodiment, the second base station 203 generates a forward handover indication, and the user equipment 201 can independently select a target cell, and overcomes a disadvantage of violating a basic criterion in the prior art that mobility management, such as handover of the user equipment, is determined and controlled by a network.

The present invention further provides a communications system of a second embodiment, and a difference between the communications system disclosed in this embodiment and the communications system 20 disclosed in the first embodiment is: the second processor 208 of the second base station 203 acquires a target cell according to mobility robustness optimization (MRO) information, or a load of the first base station 202, where the MRO information refers to information about optimization separately performed on a network for different performance indicators.

Figure 3:
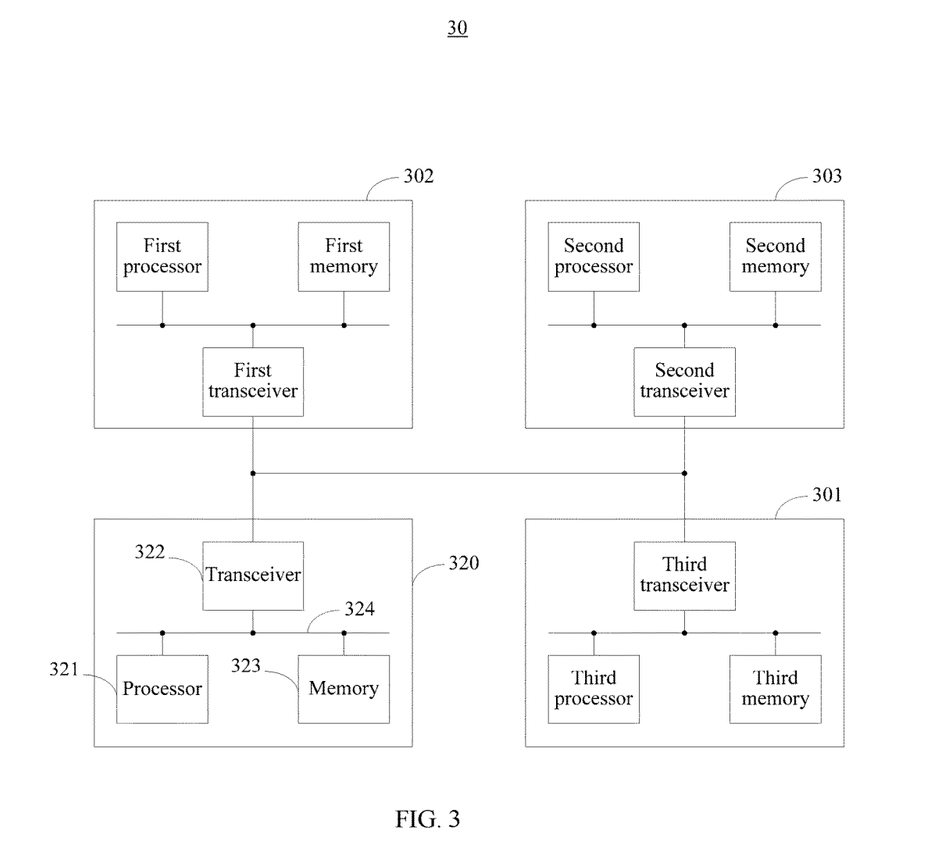
FIG. 3 is a structural diagram of a communications system according to a third embodiment of the present invention.

The present invention further provides a communications system of a third embodiment, and a difference between the communications system disclosed in this embodiment and the communications system 20 disclosed in the first embodiment is: as shown in FIG. 3, the communications system 30 disclosed in this embodiment includes: a user equipment 301, a first base station 302, a second base station 303, and a network controller 320. The network controller 320 is preferably Operation, Administration and Maintenance (OAM), and the OAM includes an operation, administration, and maintenance, where the operation mainly completes daily work performed on a network and a service, such as analysis, prediction, planning, and configuration, and the maintenance is mainly a daily operation activity performed on the network and the service, such as testing and fault management.

The OAM includes: a processor 321, a transceiver 322, a memory 323, and a data bus 324, where the processor 321, the transceiver 322, and the memory 323 are connected by using the data bus 324, to communicate with each other. The processor 321 of the OAM acquires a target cell according to MRO information, or a load of the first base station 302, and generates a forward handover indication, and the transceiver 322 of the OAM configures the forward handover indication for the first base station 302. The forward handover indication includes an identifier of a source cell, an identifier of the target cell, and an allowed identifier, where both the identifier of the source cell and the identifier of the target cell include a combination of at least one of the following: a PCI, an ECGI, a TAI, or an EARFCN.

Figure 4:
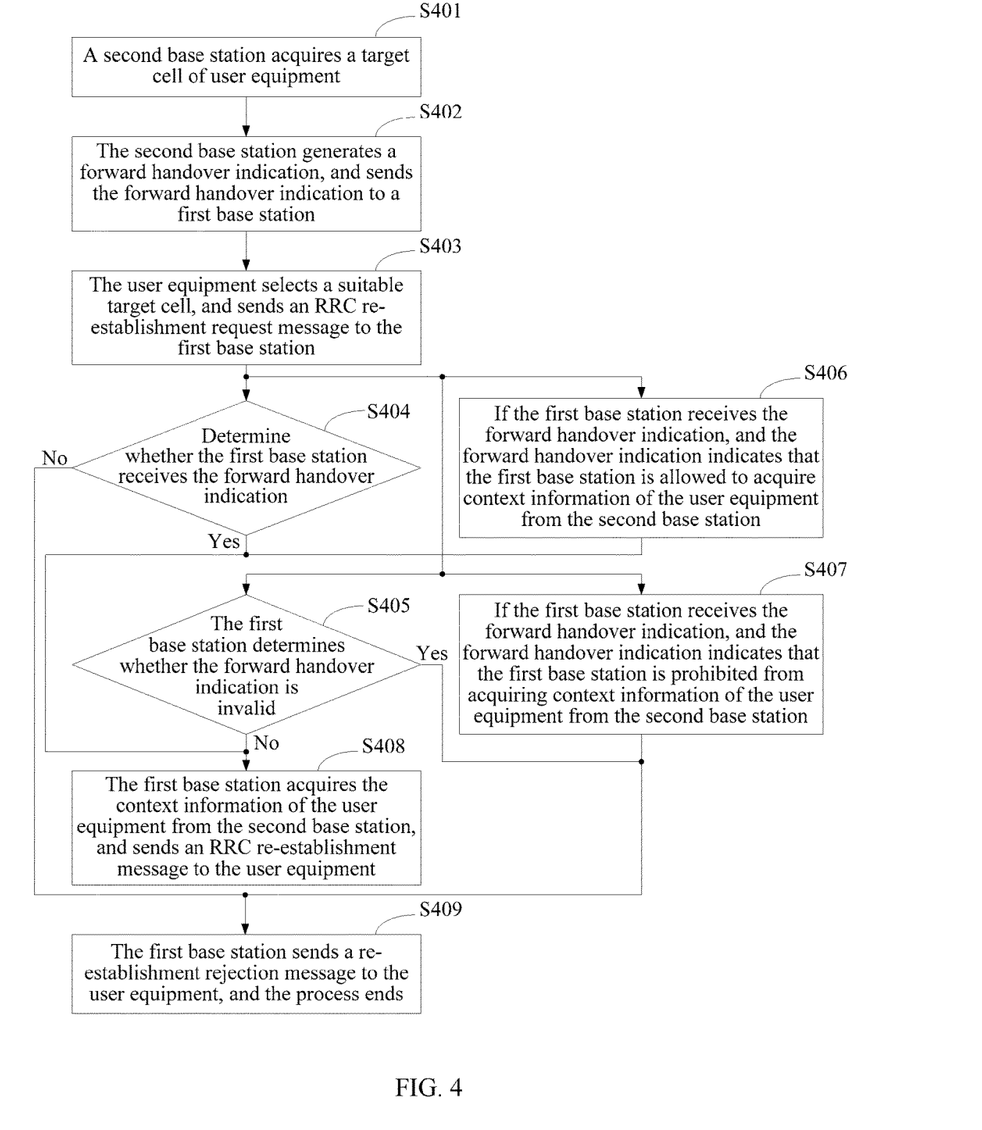
FIG. 4 is a flowchart of a forward handover method according to the first embodiment of the present invention.

The present invention further provides a forward handover method of the first embodiment, which is described on a basis of the communications system 20 disclosed in the first embodiment of the present invention. Referring to FIG. 4, the method disclosed in this embodiment includes:

S401: A second base station 203 acquires a target cell of user equipment 201.

S402: The second base station 203 generates a forward handover indication, and sends the forward handover indication to a first base station 202.

S403: The user equipment 201 selects a suitable target cell, and sends an RRC re-establishment request message to the first base station 202.

S404: Determine whether the first base station 202 receives the forward handover indication; and if the first base station 202 receives the forward handover indication, proceed to S408, or if the first base station 202 does not receive the forward handover indication, proceed to S409.

Alternatively, S405: The first base station 202 determines whether the forward handover indication is invalid; and if the forward handover indication is valid, proceed to S408, or if the forward handover indication is invalid, proceed to S409.

Alternatively, S406: If the first base station 202 receives the forward handover indication, and the forward handover indication indicates that the first base station 202 is allowed to acquire context information of the user equipment 201 from the second base station 203, proceed to S408.

Alternatively, S407: If the first base station 202 receives the forward handover indication, and the forward handover indication indicates that the first base station 202 is prohibited from acquiring context information of the user equipment 201 from the second base station 203, proceed to S409.

S408: The first base station 202 acquires the context information of the user equipment 201 from the second base station 203, and sends an RRC re-establishment message to the user equipment 201.

S409: The first base station 202 sends a re-establishment rejection message to the user equipment 201, and the process ends.

In S401, the second base station 203 acquires the target cell of the user equipment 201 according to positioning information of the user equipment 201, historical information of the user equipment 201, and/or measurement report information of the user equipment 201. Optionally, the second base station 203 further sends information about the target cell to the user equipment 201.

In S402, the forward handover indication includes an identifier of the user equipment 201, an identifier of the target cell, and an allowed identifier; or the forward handover indication includes an identifier of the user equipment 201 and an identifier of the target cell; or the forward handover indication includes an identifier of the user equipment 201, an identifier of the target cell, and a prohibited identifier; or the forward handover indication includes an identifier of the target cell and an allowed identifier. In addition, the forward handover indication further includes an identifier of a cell in which the user equipment 201 is located, that is, an identifier of a source cell. The identifier of the user equipment 201 includes a combination of at least one of the following: a CRNTI, a Short MAC-I, or an IMEI, and both the identifier of the source cell and the identifier of the target cell include a combination of at least one of the following: a PCI, an ECGI, a TAI, or an EARFCN.

In S403, when a radio link failure occurs in the user equipment 201 and the source cell, or a radio link failure occurs in a process in which the user equipment 201 hands over from the source cell to the target cell, the user equipment 201 selects a suitable target cell according to the information about the target cell. For example, the user equipment 201 selects a target cell having an optimal signal strength as the suitable target cell according to a measured signal strength of each target cell.

Different from the prior art, according to the forward handover method disclosed in this embodiment, the second base station 203 generates a forward handover indication, and the user equipment 201 can independently select a target cell, and overcomes a disadvantage of violating a basic criterion in the prior art that mobility management, such as handover of the user equipment, is determined and controlled by a network.

The present invention further provides a forward handover method of the second embodiment, which is described on a basis of the communications system disclosed in the second embodiment of the present invention. In S401, the second base station 203 acquires a target cell according to MRO information, or a load of the first base station 202, where the MRO information refers to optimization separately performed on a network for different performance indicators.

Figure 5:
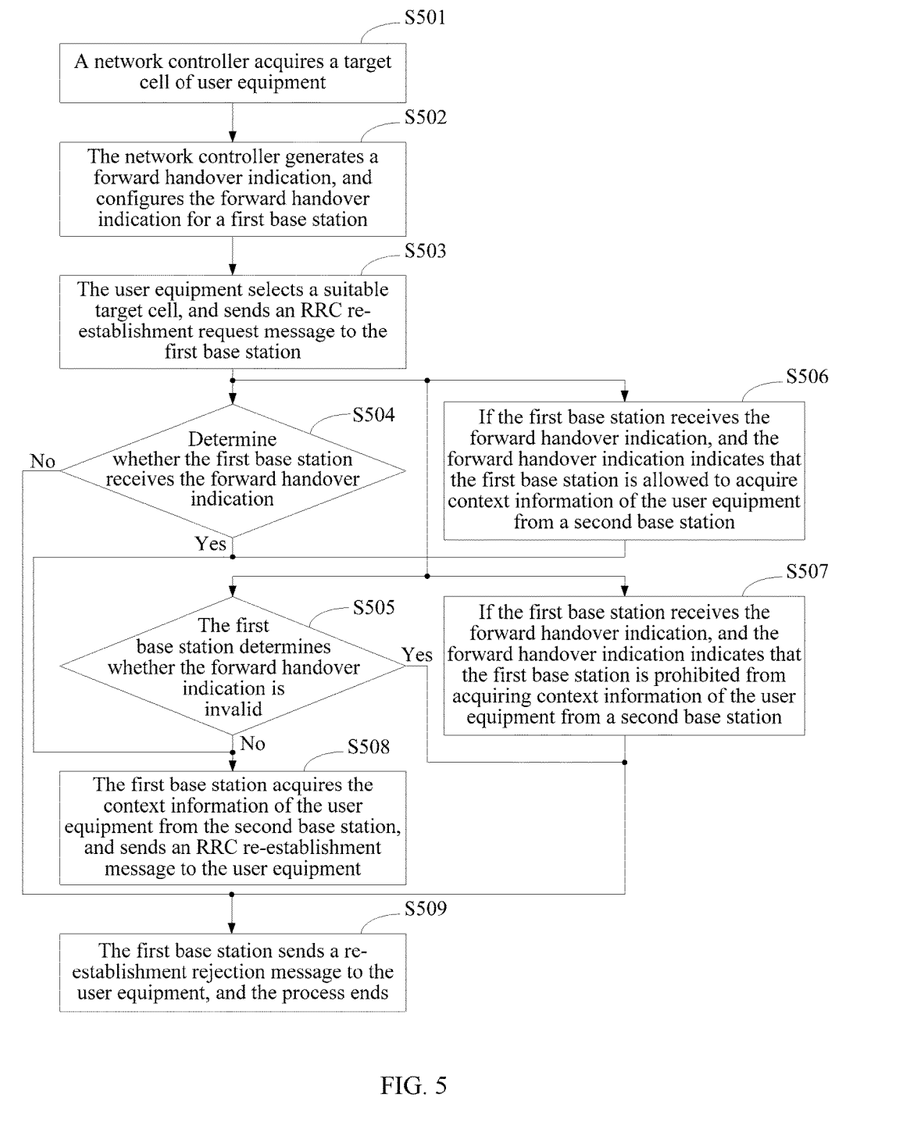
FIG. 5 is a flowchart of a forward handover method according to the third embodiment of the present invention.

The present invention further provides a forward handover method of the third embodiment, which is described on a basis of the communications system 30 disclosed in the third embodiment of the present invention. As shown in FIG. 5, the method disclosed this embodiment includes:

S501: A network controller 320 acquires a target cell of user equipment 301.

S502: The network controller 320 generates a forward handover indication, and configures the forward handover indication for a first base station 302.

S503 to S509 are the same as S403 to S409 of the forward handover method of the first embodiment of the present invention, and are not described herein.

In S501, the network controller 320 is OAM, and the network controller 320 acquires the target cell of the user equipment 301 according to MRO information, or a load of the first base station 302. Optionally, the network controller 320 sends information about the target cell to the user equipment 301.

In S502, the first base station 302 acquires context information of the user equipment 301 from a second base station 303 according to the forward handover indication. The forward handover indication includes an identifier of a source cell of the user equipment 301, an identifier of the target cell, and an allowed identifier.

Different from a situation in the prior art, in the embodiments of present invention, a second base station or OAM acquires a target cell of user equipment and sends a forward handover indication to a first base station or configures a forward handover indication for a first base station, so that when receiving an RRC re-establishment request message of the user equipment, the first base station acquires context information of the user equipment from the second base station according to the forward handover indication. Therefore, the user equipment can independently select a target cell, and overcomes a disadvantage of violating a basic criterion in the prior art that mobility management, such as handover of the user equipment, is determined and controlled by a network.

The foregoing descriptions are merely embodiments of the embodiments of present invention, and the protection scope of the present invention is not limited thereto. All equivalent structure or process changes made according to the content of this specification and accompanying drawings in the embodiments of present invention or by directly or indirectly applying the embodiments of present invention in other related technical fields shall fall within the protection scope of the present invention.

What is claimed is:

1. A target base station of a target cell of user equipment, wherein the target base station comprises a processor, a transmitter and a receiver configured to:
   receive a forward handover indication from a source base station of the user equipment or a network controller before receiving a radio resource control (RRC) re-establishment request message from the user equipment, wherein the forward handover indication comprises an allowed identifier or a prohibited identifier;
   receive a radio resource control (RRC) re-establishment request message from the user equipment;
   determine, after the reception of the RRC re-establishment request message, whether to acquire context information of the user equipment from the source base station based on a content of the forward handover indication by determining to acquire context information of the user equipment from the source base station when the forward handover indication includes an allowed identifier and determining not to acquire context information of the user equipment from the source base station when the forward handover indication includes a prohibited identifier;
   when the content of the forward handover indication includes an allowed identifier:
   acquire the context information of the user equipment from the source base station;
   generate an RRC re-establishment message; and
   send the RRC re-establishment message to the user equipment; and
   when the content of the forward handover indication includes a prohibited identifier:
   generate an RRC re-establishment rejection message; and
   send the RRC re-establishment rejection message to the user equipment.

2. The target base station according to claim 1, wherein the forward handover indication further comprises an identifier of a source cell of the user equipment.

3. The target base station according to claim 2, wherein the identifier of the user equipment comprises at least one of the following:
   a cell radio network temporary identifier (CRNTI),
   a short MAC integrity protection verification value (Short MAC-I), or
   an international mobile equipment identity (IMEI), and
   both the identifier of the source cell and the identifier of the target cell comprise a combination of at least one of the following:
   a physical cell identity (PCI),
   an evolved cell global identifier (ECGI), a tracking area identity (TAI), or
   an E-UTRA absolute radio-frequency channel number (EARFCN).

4. The target base station according to claim 1, wherein acquiring the context information from the source base station comprises:
   determining, by the processor, whether the forward handover indication is invalid; and
   if the forward handover indication is valid,
      acquiring, by the processor, the context information of the user equipment from the source base station,
      generating the RRC re-establishment message, and
      sending, by the transmitter, the RRC re-establishment message to the user equipment; or
   if the forward handover indication is invalid,
      generating, by the processor, a re-establishment rejection message, and
      sending the re-establishment rejection message to the user equipment by the transmitter.

5. The target base station according to claim 1, wherein acquiring the context information from the source base station comprises:
   if the forward handover indication indicates that the target base station is allowed to acquire the context information of the user equipment from the source base station,
      acquiring, by the processor, the context information of the user equipment from the source base station,
      generating the RRC re-establishment message, and
      sending, by the transmitter, the RRC re-establishment message to the user equipment; or
   if the forward handover indication indicates that the target base station is prohibited from acquiring the context information of the user equipment from the source base station,
      generating, by the processor, a re-establishment rejection message, and
      sending the re-establishment rejection message to the user equipment by the transmitter.

6. A non-transitory, computer readable medium, including instructions that, when executed by a processor, cause the processor to perform a method comprising:
   receiving a forward handover indication from a source base station of a user equipment or a network controller before receiving a radio resource control (RRC) re-establishment request message from the user equipment, wherein the forward handover indication comprises an allowed identifier or a prohibited identifier;
   receiving an RRC re-establishment request message from the user equipment;
   determining, after the reception of the RRC re-establishment request message, whether to acquire context information of the user equipment from the source base station based on a content of the forward handover indication by determining to acquire context information of the user equipment from the source base station when the forward handover indication includes an allowed identifier and determining not to acquire context information of the user equipment from the source base station when the forward handover indication includes a prohibited identifier; and
   when the content of the forward handover indication includes an allowed identifier:
   acquiring the context information of the user equipment from the source base station;
   generating an RRC re-establishment message; and
   sending the RRC re-establishment message to the user equipment;
   when the content of the forward handover indication includes a prohibited identifier:

generating an RRC re-establishment rejection messages; and sending the RRC re-establishment rejection message to the user equipment.

7. The non-transitory, computer readable medium according to claim 6, wherein the forward handover indication further comprises an identifier of a source cell of the user equipment.

8. The non-transitory, computer readable medium according to claim 6, wherein the identifier of the user equipment comprises at least one of the following:
   a) a cell radio network temporary identifier (CRNTI),
   b) a short MAC integrity protection verification value (Short MAC-I), or
   c) an international mobile equipment identity (IMEI), and both the identifier of the source cell and the identifier of the target cell comprise a combination of at least one of the following:
   a) a physical cell identity (PCI),
   b) an evolved cell global identifier (ECGI), a tracking area identity (TAI), or
   c) an E-UTRA absolute radio-frequency channel number (EARFCN).

9. The non-transitory, computer readable medium according to claim 6, wherein acquiring the context information from the source base station comprises:
   determining, by the processor, whether the forward handover indication is invalid; and
   if the forward handover indication is valid,
     acquiring, by the processor, the context information of the user equipment from the source base station,
     generating the RRC re-establishment message, and
     sending, by the transmitter, the RRC re-establishment message to the user equipment; or
   if the forward handover indication is invalid,
     generating, by the processor, a re-establishment rejection message, and
     sending the re-establishment rejection message to the user equipment by the transmitter.

10. The non-transitory, computer readable medium according to claim 6, wherein acquiring the context information from the source base station comprises:
    if the forward handover indication indicates that the base station is allowed to acquire the context information of the user equipment from the source base station,
      acquiring, by the processor, the context information of the user equipment from the source base station,
      generating the RRC re-establishment message, and
      sending, by the transmitter, the RRC re-establishment message to the user equipment; or
    if the forward handover indication indicates that the target base station is prohibited from acquiring the context information of the user equipment from the source base station,
      generating, by the processor, a re-establishment rejection message, and
      sending the re-establishment rejection message to the user equipment by the transmitter.

11. The non-transitory, computer readable medium according to claim 9, wherein the forward handover indication further comprises time information and is valid within a period of time of the time information.

12. A method at a target base station of a target cell for receiving handover of a connection to user equipment in communication with a source base station, the method comprising:

receiving a forward handover indication from the source base station or a network controller before receiving a radio resource control (RRC) re-establishment request message from the user equipment, wherein the forward handover indication comprises an allowed identifier or a prohibited identifier;

receiving an RRC re-establishment request message from the user equipment;

determining, after the reception of the RRC re-establishment request message, whether to acquire context information of the user equipment from the source base station based on a content of the forward handover indication by determining to acquire context information of the user equipment from the source base station when the forward handover indication includes an allowed identifier and determining not to acquire context information of the user equipment from the source base station when the forward handover indication includes a prohibited identifier;

when the content of the forward handover indication includes an allowed identifier:
  acquiring the context information from the source base station;
  generating an RRC re-establishment message; and
  sending the RRC re-establishment message to the user equipment;

when the content of the forward handover indication includes a prohibited identifier:
  generating an RRC re-establishment rejection message; and
  sending the RRC re-establishment rejection message to the user equipment.

13. The method of claim 12, wherein the forward handover indication further comprises an identifier of a source cell of the user equipment.

14. The method of claim 12, wherein the identifier of the user equipment comprises at least one of the following:
   a) a cell radio network temporary identifier (CRNTI),
   b) a short MAC integrity protection verification value (Short MAC-I), or
   c) an international mobile equipment identity (IMEI), and both the identifier of the source cell and the identifier of the target cell comprise a combination of at least one of the following:
   a) a physical cell identity (PCI),
   b) an evolved cell global identifier (ECGI), a tracking area identity (TAI), or
   c) an E-UTRA absolute radio-frequency channel number (EARFCN).

15. The method of claim 12, wherein acquiring the context information of the user equipment from the source base station comprises:
    determining whether the forward handover indication is invalid; and
    if the forward handover indication is valid,
      acquiring the context information of the user equipment from the source base station, and
      generating the RRC re-establishment message, and
      sending the RRC re-establishment message to the user equipment; or
    if the forward handover indication is invalid,
      generating a re-establishment rejection message, and
      sending the re-establishment rejection message to the user equipment.

16. The method of claim 12, wherein acquiring the context information of the user equipment from the source base station comprises:

if the forward handover indication indicates that the target base station is allowed to acquire the context information of the user equipment from the source base station,
    acquiring the context information of the user equipment from the source base station,
    generating the RRC re-establishment message, and
sending the RRC re-establishment message to the user equipment; or
if the forward handover indication indicates that the target base station is prohibited from acquiring the context information of the user equipment from the source base station,
generating a re-establishment rejection message, and
sending the re-establishment rejection message to the user equipment.

* * * * *